Patented July 18, 1939

2,166,556

UNITED STATES PATENT OFFICE 2,166,556

CONVERSION OF MALEIC ACID TO MALEIC ANHYDRIDE

Le Roy U. Spence, Cheltenham, and John C. Mitchell, Philadelphia, Pa., assignors to Röhm & Haas Company, Philadelphia, Pa.

No Drawing. Application October 16, 1937, Serial No. 169,464

3 Claims. (Cl. 260—341)

This invention relates to a process of converting maleic acid into its anhydride.

It is known that maleic acid when heated decomposes into maleic anhydride and water and several processes have been proposed for distilling out the water in order to prevent its recombining with the anhydride. To merely heat the acid and thereby vaporize the liberated water while preventing the distillation of the anhydride is not practical for the reason that when maleic acid is heated above its melting point it gradually changes to fumaric acid. Because of this, most processes for separating the water vapor have involved methods of reducing the temperature at which the water can be removed such as the use of vacuum or the presence of volatile organic hydrocarbons or chlorinated hydrocarbons which on distillation carry over the water vapor. Both these methods have numerous disadvantages and do not without further modification overcome the objectionable formation of fumaric acid.

The vacuum method requires a careful control of temperature and vacuum to prevent vaporization of anhydride and even when carried out under optimum conditions gives a highly corrosive aqueous solution of maleic acid as distillate.

The use of hydrocarbons or chlorinated hydrocarbons to assist the removal of water gives a fairly good yield of anhydride with little fumaric acid formation. This process is usually carried out by distilling out the water and hydrocarbon or chlorinated hydrocarbon, separating the water vapor from the distillate, and returning the solvent to the reaction vessel. Maleic acid is practically insoluble in hydrocarbons and chlorinated hydrocarbons and either accumulates on the sides of the reaction vessel or melts and forms a second layer which remains until the reaction is nearly complete. This interferes with the heating of the reaction vessel and tends to cause overheating of the maleic acid at the sides of the vessel. Molten maleic acid is very corrosive to iron, aluminum, stainless steel, etc., so that the process is not readily carried out in the usual equipment readily available. Another disadvantage is that maleic anhydride is also carried into the condenser with the hydrocarbon or chlorinated hydrocarbon and reacts with the water condensed there, so that the water separated contains considerable dissolved maleic acid. This causes severe corrosion in the condensers, even when constructed of aluminum, stainless steel, etc. Also, the maleic acid dissolved in the water frequently represents from five to ten percent of the charge and must be recovered if good yields are to be realized. When the dehydration is complete, the separation of the anhydride from the solvent requires considerable fractionation because of the tendency of the anhydride to distill over with the solvent.

An efficient and simple method of converting maleic acid into its anhydride is highly desirable for the impurities present in the crude maleic acid obtained by the catalytic oxidation of benzene, toluene, naphthalene, etc., are more readily removed from the anhydride than from the acid. The usual methods of recrystallization, treatment with decolorizing agents, such as activated carbons, fullers earth, etc., are not effective and since heating tends to convert the maleic acid to fumaric acid, processes involving a heating of the acid are not available. To obtain a satisfactory product, it is best to convert the crude acid into its anhydride and remove the impurities from the anhydride as, for instance, by the method described in copending application Serial No. 115,127, filed December 10, 1936.

The object of this invention is to provide a simple, efficient and economical method of converting maleic acid into its anhydride, particularly the crude maleic acid obtained by catalytic oxidation processes.

A further object is to provide a method of converting maleic acid into its anhydride that can be carried out in apparatus made of the more common structural materials, such as stainless steel, without danger of excessive corrosion.

A still further object is to provide a method of converting maleic acid into its anhydride which will give high yields of the anhydride without excessive formation of fumaric acid and without the need of recovering maleic acid from the separated water.

Other and still further objects will appear from the following description of our process.

These objects are accomplished by the present invention which is an improvement in the aforementioned process which utilizes low boiling organic solvents for assisting the removal of water. In general the improvement consists in the following features:

1. The use of a high boiling solvent for maleic acid to keep the acid in solution during the dehydration and thereby avoid local overheating which causes rapid fumaric acid formation. The dilution of the maleic acid by the solvent also decreases the rate of fumaric acid formation, and reduces the corrosive action so that the process can be carried out in stainless steel without undue corrosion.

2. The use of a low boiling hydrocarbon or chlorinated hydrocarbon to carry out the water formed in the dehydration step. A comparatively small amount of this is used, the quantity added being adjusted to give as low a temperature in the reaction as can be used and yet obtain a satisfactory rapid rate of dehydration. The lower temperatures are preferred because of the slower rate of formation of fumaric acid under these conditions.

3. The use of a fractionating column in the dehydration process. A comparatively short fractionating column will hold back the anhydride when a low boiling compound is used to remove water and permit the separation of the water free from maleic acid. This not only prevents corrosion in the condenser, but also avoids the necessity of recovering maleic acid from the water of dehydration and thereby improves the yield of maleic anhydride obtained.

Of these steps, numbers 1 and 2 are essential to the process. Number 3 is preferably included but not essential.

When the process is applied to the maleic acid obtained by the catalytic oxidation of hydrocarbons, it is desirable to avoid the absorption of the reaction products in water, since, to recover the crude maleic acid from the water solution, the evaporation must be carried out at a low temperature to avoid the formation of fumaric acid and even when so done the process is complicated by the corrosive action of the water solution of maleic acid. The evaporation may be avoided by contacting the reaction gases with a saturated maleic acid solution so that the product absorbed is converted to solid maleic acid which may be filtered and dried in a current of warm air. Preferably, however, as much of the maleic anhydride as is practical is condensed out of the reaction gases in a condenser operated slightly above the melting point of maleic anhydride to prevent solidification with its resulting plugging of the condenser and interference with the proper heat transfer. What passes through uncondensed may be absorbed in a high-boiling, non-aqueous solvent, preferably a high boiling ester. Since the reaction gases contain considerable water vapor, both the fraction condensed and that absorbed in the high-boiling, non-aqueous liquid will react with the water and give a mixture of acid and anhydride. The relative proportions of acid and anhydride in each fraction will vary with the temperature of the condenser and absorber, the concentration of the water vapor in the reaction gases and the time of contact with the reaction gases. However, in the absence of liquid water the corrosive action of the acid at these temperatures is negligible and iron is a suitable material of construction.

As the high boiling solvent that may be used in the process, compounds that boil higher than maleic anhydride (200° C.) are preferred so that the maleic anhydride can be distilled from the solvent after the dehydration is complete. A temperature difference of 30° C. or more is desirable for easy separation. The required solvent capacity of the high boiling solvent will depend on the nature of the material being treated. If it is substantially all maleic acid, the solvent used must be capable of holding the entire quantity in solution at the temperature of dehydration. High boiling esters, such as dimethyl and diethyl phthalate, dibutyl maleate, ethyl laurate, butyl stearate are especially suited for this purpose. If a mixture of maleic acid and its anhydride is to be dehydrated, other solvents which are poorer solvents for maleic acid may be used due to the solvent action of the anhydride present. If desired, maleic anhydride may be added to maleic acid in order that these poorer solvents might be used or maleic anhydride can itself be used as the solvent. Among the liquids that may be used for mixtures of maleic acid and anhydride are such solvents as α-chloronaphthalene, diphenyl, diphenyl ether, α-methyl naphthalene, α-naphthyl methyl ether and 2-nitro-cymene. The following list gives the melting point and boiling point of some suitable solvents.

| Compound | Melting point | Boiling point |
|---|---|---|
| | Degrees | °C. |
| Maleic anhydride | 52 | 200 |
| Amyl phthalate | | 204 (11 mm.) |
| Anethole | 21 | 232 |
| n-Butyl maleate | | 128 (4 mm.) |
| n-Butyl oleate | | 190 (2 mm.) |
| n-Butyl stearate | 18 | |
| n-Butyl oxalate | | 243 |
| n-Butyl benzoate | | 249 |
| n-Butyl phthalate | | 338 |
| α-Chloronaphthalene | | 263 |
| Diethyl phthalate | | 295 |
| Dimethyl phthalate | | 282 |
| Diphenyl | 71 | 255 |
| Diphenyl ether | 27 | 259 |
| Diethyl maleate | | 225 |
| α-Methyl naphthalene | | 240 |
| β-Methyl naphthalene | 32 | 242 |
| 2-Nitro cymene | | 264 |
| α-Naphthyl methyl ether | | 265 |
| Phthalic anhydride | 131 | 285 |

As low boiling hydrocarbon or chlorinated hydrocarbon, compounds boiling below 130° C. are preferred so that they may be easily separated after dehydration is complete. Among the low boiling compounds suitable for carrying over the water vapor are:

| | Boiling point, degrees |
|---|---|
| Chloroform | 61 |
| Trichlorethane | 74 |
| Carbon tetrachloride | 78 |
| Ethylene dichloride | 83 |
| Propylene dichloride | 98 |
| Isopropyl ether | 68 |
| n-Propyl ether | 90 |
| n-Hexane | 68 |
| Petroleum fractions | 60 –110 |
| Benzene | 80 |
| Cyclohexane | 80 |
| Methyl cyclohexane | 100 |
| Toluene | 110 |

Of these, benzene is the most convenient to use when engaged in the manufacture of maleic acid from benzene, because of its availability.

The fractionating column used to hold back the maleic anhydride need only be a relatively short one. Its size and operation will depend upon the low boiling compound used to carry over the water vapor and is easily determinable by those skilled in the art. When benzene is used for this purpose, a column equivalent to from 3 to 5 theoretical plates is sufficient.

In carrying out the process the maleic acid or maleic acid-anhydride mixture is added to the high boiling solvent, or the product from a scrubbing system using one of these solvents to recover the products of a catalytic oxidation process is taken, and sufficient low boiling compound is added so that the mixture boils at between 110°–160° C. at atmospheric pressure. The water is then distilled off with the aid of the low boiling compound through a suitable column which retains the maleic anhydride in the reaction vessel and thus keeps the maleic acid out of the water removed. The low boiling compound is separated from the water carried over and is returned as reflux for the column.

It is preferable to start the dehydration at 110°-130° C. and then, when the water is nearly all removed, some of the low boiling solvent is distilled off to raise the reaction temperature to 150-170° C. in order that the dehydration may be completed in a short time. Thus, by starting at a low temperature, the fumaric acid formation is kept down, and when nearly all the water has been removed the dehydration rate can be increased and brought to completion in a short time.

The invention is illustrated by the following examples:

*Example 1.*—58 g. of maleic acid, 47 g. of maleic anhydride, and 37 cc. of benzene were placed in a flask fitted with a short fractionating column equivalent to three theoretical plates. The top of the fractionating column was connected to a reflux condenser and a water separator which removed water from the reflux liquid before it was fed back into the column. The mixture was heated to boiling which started at 112° C. The water split out of the maleic acid rapidly collected in the trap. The temperature of the reaction mixture gradually increased. When the water evolution slowed down some of the benzene was removed, bringing the temperature up to 165° C. At the end of 2½ hours there was very little water coming off and the reaction was stopped. The water removed had only a trace of maleic acid in it (0.07% by weight). 97.4 g. of maleic anhydride was recovered, a yield of 99% of theory, based on the maleic acid used. The yield of fumaric acid was 1%.

*Example 2.*—A mixture of 116 g. of maleic acid, 100 cc. diethyl phthalate, and 45 cc. of benzene, was charged to the same apparatus used in Example 1 and treated in a similar manner. Boiling started at 116° C. and after three hours the temperature was brought up to 144° C. The yield of maleic anhydride was 96.5% of theory, 3.5% being converted to fumaric acid.

*Example 3.*—A mixture consisting of 232 g. maleic acid, 196 g. maleic anhydride, 250 cc. dimethyl phthalate, and 115 cc. of benzene, was heated for 3½ hours at 128-135° C. in the apparatus of Example 1. The yield of maleic anhydride was 95%. This slightly lower yield is due to the longer time of heating and could be improved by increasing the temperature near the end of the reaction.

*Example 4.*—This example is given to illustrate the process carried out without the use of a fractionating column. 116 g. of maleic acid, 100 cc. of diethyl phthalate, and 45 cc. of benzene, were heated in the appartus used in Exmple 1 from which the fractionating column had been removed, for three hours at 116-144° C. The water layer removed in the water separator contained 2.7 g. of maleic acid or 2.3% of the charge. The yield of maleic anhydride was 94% of the theoretical.

We claim:

1. The process of converting maleic acid to maleic anhydride which comprises mixing maleic acid with a high boiling inert solvent for the maleic acid that boils at a temperature of at least 200° C. and a low boiling liquid that is a member of the group consisting of hydrocarbons and chlorinated hydrocarbons that boil below 130° C., heating the mixture under atmospheric pressure and distilling off the water of reaction through a fractionating column that condenses the maleic anhydride but permits the passage of water vapor and said low boiling compound, separating the said low boiling compound from the water and returning it as reflux for the fractionating column, continuing the distillation until the evolution of water diminishes, then distilling off part of the low boiling material to raise the boiling point of the reaction mixture to from 150-170° C., and distilling out substantially all the remaining water at said higher temperature.

2. The process of converting maleic acid to maleic anhydride which comprises mixing maleic acid with a high boiling solvent that is an ester of an organic acid boiling at a temperature of at least 200° C. and a low boiling liquid that is a member of the group consisting of hydrocarbons and chlorinated hydrocarbons boiling below 130° C., heating the mixture under atmospheric pressure and a temperature of from 110-130° C. and distilling off the water of reaction through a fractionating column that condenses the maleic anhydride but permits the passage of water vapor and said low boiling compound, separating the said low boiling compound from the water and returning it as reflux for the fractionating column, continuing the distillation until the evolution of water diminishes, then distilling off part of the low boiling material to raise the boiling point of the reaction mixture to from 150-170° C., and distilling out substantially all the remaining water at said higher temperature.

3. The process of converting maleic acid to maleic anhydride which comprises mixing maleic acid with a high boiling inert solvent boiling at a temperature of at least 230° C. and a low boiling liquid that is a member of the group consisting of hydrocarbons and chlorinated hydrocarbons boiling below 130° C., heating the mixture under atmospheric pressure and a temperature of 110-130° C., distilling off the water of reaction through a fractionating column that condenses the maleic anhydride but permits the passage of water vapor and said low boiling compound, separating said low boiling compound from the water and returning it as reflux for the fractionating column, continuing the distillation until the evolution of water diminishes, then distilling off part of the low boiling material to raise the boiling point of the reaction mixture to from 150-170° C., distilling out substantially all the remaining water and the low boiling material and finally, after dehydration is complete, distilling the maleic anhydride from the said high boiling solvent.

LE ROY U. SPENCE.
JOHN C. MITCHELL.